United States Patent [19]

Prohaska et al.

[11] Patent Number: 4,578,741

[45] Date of Patent: Mar. 25, 1986

[54] VEHICLE LIGHT WITH SEVERAL INCANDESCENT LAMPS HAVING IMPROVED CONTACT MEANS

[75] Inventors: Hans Prohaska, Bietigheim-Bissingen, Fed. Rep. of Germany; Daniele Sosthene, Draney, France

[73] Assignee: ITT Industries, Inc., New York, N.Y.

[21] Appl. No.: 400,453

[22] Filed: Jul. 21, 1982

[30] Foreign Application Priority Data

Aug. 5, 1981 [DE]   Fed. Rep. of Germany ....... 3131018

[51] Int. Cl.⁴ ........................ B60Q 1/26; F21V 21/00
[52] U.S. Cl. ..................................... 362/249; 362/80; 339/17 D; 339/182 L
[58] Field of Search ............ 339/259 R, 255 R, 17 D, 339/182 L, 189 L, 10, 127 C, 127 R; 362/80, 61, 249

[56]           References Cited

U.S. PATENT DOCUMENTS

| 3,314,042 | 4/1967 | Gabrielian | 339/17 D |
| 4,246,632 | 1/1981 | Hancox | 339/17 D X |
| 4,364,101 | 12/1982 | Brockmeyer | 362/80 |

FOREIGN PATENT DOCUMENTS

| 2441330 | 3/1976 | Fed. Rep. of Germany . |  |
| 2602237 | 7/1977 | Fed. Rep. of Germany | 362/249 |
| 2945733 | 5/1981 | Fed. Rep. of Germany . |  |
| 2102935 | 2/1983 | United Kingdom | 362/61 |

Primary Examiner—Stephen C. Bentley
Assistant Examiner—John S. Maples
Attorney, Agent, or Firm—James B. Raden; William J. Michals

[57]           ABSTRACT

A multiple lamp assembly is disclosed which uses stamped metal conductors. The problem of obtaining good contact to the center terminal of the lamp is corrected by providing an additional spring to the lamp recess. The added spring is held by a stepped extension fitted in a slot in the lamp recess.

8 Claims, 4 Drawing Figures

VEHICLE LIGHT WITH SEVERAL INCANDESCENT LAMPS HAVING IMPROVED CONTACT MEANS

BACKGROUND OF THE INVENTION

The invention relates to a vehicle light assembly including several incandescent lamps which are inserted in a common lamp holder by means of a cap, which forms the connection of the incandescent lamp, and which has at least one center contact as a further connection. The assembly features metal conductors insulated from one another and consisting of sheet metal, which metal conductors are secured on the lamp holder and of which at least one rests against the center contact of this incandescent lamp, and comprising at least one separate, additional spring which presses the end portion against the center contact.

Currently it is usual to accomodate the incandescent lamps necessary for the different signalling functions as tail light, brake light, turn-signal light and back-up light, in a multi-purpose light assembly which is divided into several chambers. The connection of the light assembly is effected via a single multiple plug. Therefore within the light assembly conductive connections have to be provided between the incandescent lamps and the various connection points in the multiple plug. Generally metal conductors from sheet metal are being used for this purpose. These metal conductors are conducted from the multiple plug to the incandescent lamps.

A multiple-purpose light assembly as outlined above is, for example, known from the German specification OS No. 2,441,330. One metal conductor of this light assembly, which metal conductor forms the common earth connection for all incandescent lamps, is bent into the lamp holders like a lug and rests against the cap of the incandescent lamp there. The center contacts of the incandescent lamps are connected to the assigned metal conductors via separately produced contact springs. Thereby the end of the metal conductors neighbouring the respective incandescent lamp forms an angle and is pushed to fit on the end of a fork-shaped, slotted contact spring, whose other end rests resiliently against the center contact of the incandescent lamp. When the current is supplied in this way an electric contact resistance appears between the metal conductor and the one end of the contact spring and between the other end of the contact spring and the center contact of an incandescent lamp. In order to diminish the contact resistances according to the German specification OS No. 2,945,733 one has abstained from using the contact spring and elongated the metal conductors as far as directly to the center contacts of the incandescent lamps. The necessary contact pressure between a metal conductor and the center contact of an incandescent lamp is produced by an additional contact spring which is supported on the lamp holder and on the metal conductor and presses the latter against the center contact. In an example of the German specification OS No. 2,945,733 the additional spring is a plastics lug formed on the lamp holder. Such a version can be produced extremely economical, but after a longer service life could perhaps involve malfunctions, because the plastics lug loses part of its spring tension under the influence of the warmth of the incandescent lamps. In a second embodiment therefore a separate helical compression spring is provided which is positioned below the cap of the incandenscent lamp in a lamp holder being part of the lamp supporting member.

Starting from the prior art described the present invention is based on the problem of developing a vehicle light assembly including the features of the invention in such a way that it can be mounted in a simple way and substantially without faults and that at the same time a reliable contactmaking is ensured together with a contact pressure as constant as possible over the entire service life of a motor vehicle.

SUMMARY OF THE INVENTION

According to the invention this problem is solved in that, in a light assembly including the features of the invention the additional spring with a first portion on its first end far from the center contact is put in a recess of the lamp holder. Whereas the prior art with the loosely inserted helical compression spring involves the danger that the spring is lost at further assembly steps, insofar as it is inserted in the lamp holder before the metal conductors are mounted, or that the assembly is difficult, when the spring is inserted only after the metal conductors, in a vehicle light assembly according to the invention the separate, additional spring is reliably held in its position after it has been mounted. The vibrations of a vehicle during its operation cannot affect the position of the compression spring either, because the spring fits reliably in the recess of the lamp holder. Thus over the entire service life of the motor vehicle a faultless contact-making between a metal conductor and the respective center contact of an incandescent lamp is ensured.

Advantageous developments of a vehicle light assembly according to the invention can be seen. So for instance a development according to the invention is especially of advantage, for when the inserted portion is bent from the metal conductor plane and stands perpendicularly on the metal conductor plane it is very easily possible to produce the recess in the lamp holder, which is normally made of plastics material, by means of a very simple tool without a cross-slide. When according to the invention the recess in the supporting member is closed behind the inserted end of the spring the danger of injuries is diminished.

It is also of advantage, when according to the invention the portion at the free end of the spring extends in the longitudinal direction and below the end portion of the metal conductor. In such an arrangement the spring does not need any additional space below the cap of the incandescent lamp, and the end portion of the metal conductor can be supported over a long distance.

In the most advantageous development according to the invention the spring has a portion which is approximately rectangularly bent from the second portion resting against the metal conductor, extends approximately in parallel to the metal conductor plane and is subject to torsional strain. In such a design the spring travel is at most a slight deformation of the free spring portion, because the spring force is produced by the torsion of one spring portion. Therefore the free spring portion may support the metal conductor end portion over a relatively long distance, so that a good contact pressure is reached substantially independently of production tolerances. A twisting of that entire portion of the compression spring which is to be subject to torsion can in a simple way be reliably avoided by developing the vehicle light assembly according to the invention. The compression spring is accordingly composed of three portions, which are bent from one another in a particular manner. It proved to be especially advantageous to give the three portions a shape in which they are adapted to form a U. For in this case the one shank can be easily supported on the lamp holder without additional fastening means by a mere support on the supporting member that, when the second shank, which rests against the metal conductor, springs resiliently to the outside the entire web between the two shanks cannot be twisted, but is only subject to torsion. A development according to the invention can advantageously be realised in any vehicle light assembly.

According to the invention firm hold of the spring can be additionally improved in that it is at least partly covered by a permanently set projection of the lamp holder. When also the metal conductors are secured on the lamp holder by permanently set projections, a projection can have such a position that it can simultaneously serve for securing the spring and a metal conductor.

Especially to be used in a vehicle light assembly according to the invention, all springs which have a stretched form or are composed of several portions with a stretched form. Particularly a bar spring from spring wire according to another feature is appropriate.

In a development according to the invention no complicated bendings of the metal conductors are necessary which lead to the center contacts of the incandescent lamps. In this case the contact-making between the cap of the incandescent lamp and a corresponding metal conductor is advantageously achieved according to the invention in that one metal conductor, which is connected with the cap of an incandescent lamp in an electrically conductive manner, with a portion surrounding the cap is elevated in a plane parallel to the metal conductor plane by means of two opposed bendings which form edges and that two lugs are bent from the portion substantially perpendicularly against which lugs the cap of the incandescent lamp rests. By these bendings it is possible to punch out from one piece of sheet metal both metal conductors, namely the one leading to the center contact and the one having the portion which surrounds the cap of the incandescent lamp and has two lugs, because, when the condition of all metal conductors is completely plane the two lugs are outside of the metal conductor which leads to the center contact of an incandescent lamp.

BRIEF DESCRIPTION OF THE DRAWING

One embodiment of a lamp holder of a vehicle light assembly is shown in the Figs. of the drawing. The invention is now to be described in detail by way of this embodiment. The drawings show.

DETAILED DESCRIPTION OF THE DRAWING

Figure 1:
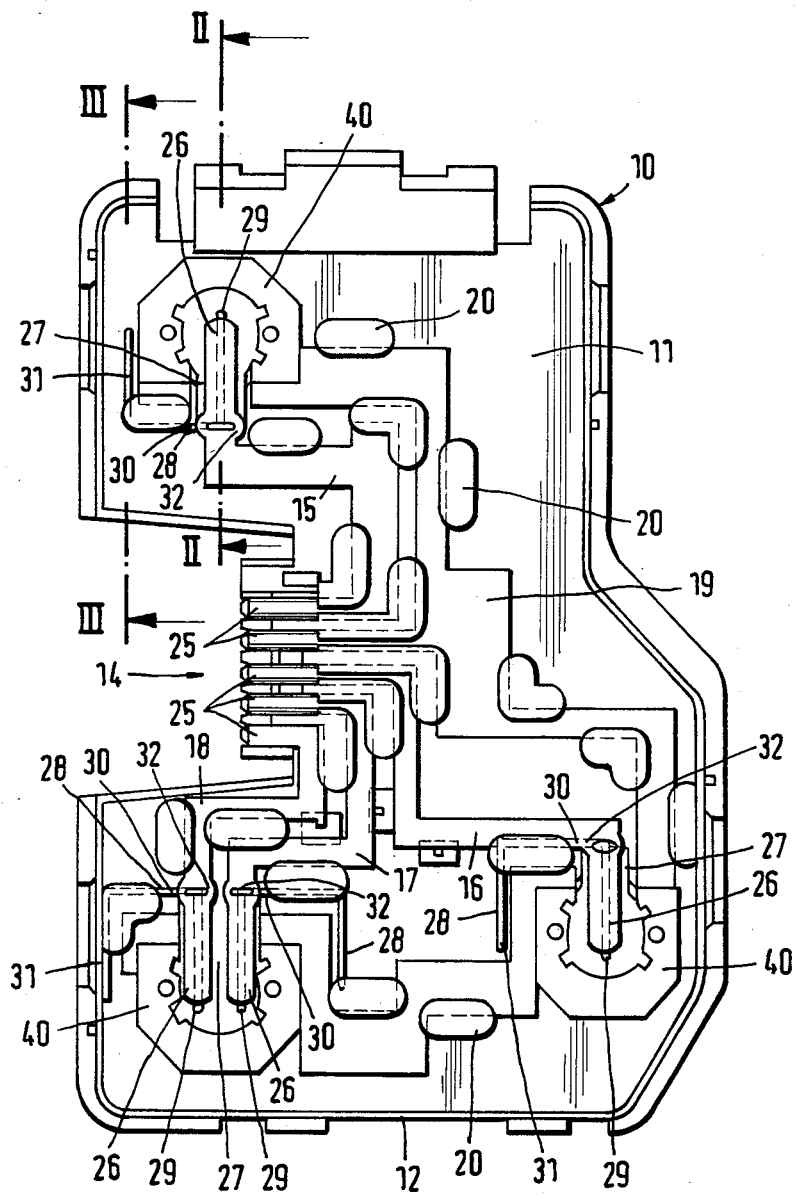
FIG. 1 a top view on the lamp holder of a vehicle light assembly according to the invention, FIG. 2 a section taken on the line II—II of FIG. 1, FIG. 3 a section taken on the line III—III of FIG. 1 and FIG. 4 a section corresponding to that of FIG. 3, however through a slightly modified version.
Figure 2:
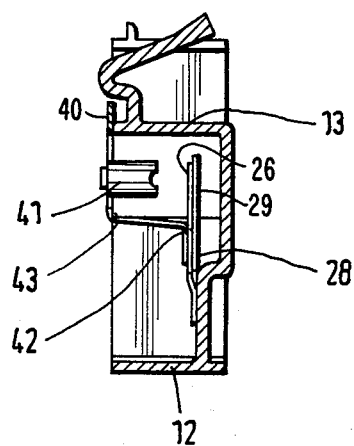

The lamp holder 10 shown is substantially formed by a plane plate 11, which is surrounded by a rim 12 and on which a cup-shaped recess 13 for the cap of an incandescent lamp is formed in three places. From a central multiple plug 14 separate insulated metal conductors 15, 16, 17 and 18 lead to the various recesses 13. All recesses have in common a metal conductor 19 which serves as a common connection for the incandescent lamps to one pole of a voltage source. In addition to the metal conductors there are projections 20 in some places of the plate 11, which projections are laterally pressed over the metal conductors by permanent deformation and secure these to the lamp holder 10. Only some of the projections 20 have been given reference numerals. In the area of the multiple plug 14 the metal conductors 15 to 19 extend in parallel to one another and form flat plugs 25. The other end 26 of the metal conductors 15 to 18 enters the interior of the recesses 13 through a longitudinal slot 27 and, when the incandescent lamps are inserted, rest against the center contact of an incandescent lamp there. No complicated bendings are necessary on the metal conductors 15 to 18, especially on their end portion 26, because the metal conductors are substantially positioned in one plane whose level corresponds to that of the level of the center contacts of the incandescent lamp.

The metal conductors are made from a non-resilient sheet metal material. Therefore it is necessary to produce the contact pressure between the end portions 26 of the metal conductors 15 to 18 and the center contact of the incandescent lamps by an additional spring 28. In the embodiment shown a bar spring from a round spring wire is being used for this purpose. In the top view according to FIG. 1 this spring has the shape of a U with the two shanks 29 and 31 and the web 30 which, just like the two other portions is substantially positioned in a plane extending in parallel to the plate 11 of the lamp holder 10. The shank 29 of the spring 28 extends below the end portion 26 of the metal conductor 15 to 18 and in parallel thereto. The portion 30 of each spring 28 is bent from the shank 29 in that direction which is the most advantageous for arranging the spring. Thereby it has predominantly to be taken care that the spring 28 assigned to a particular metal conductor has no electric connection to another metal conductor. Because the shank 31 of each spring 28 is supported on the plate 11 of the lamp holder, the web 20 cannot be turned, when the shank 29 moves in the direction of the top view according to FIG. 1. Thereby the web 30 is rather subject to torsional strain. The shank 31 is pressed against the plate 11.

In order to obtain a defined bending edge and a good movability of the end portion 26 relative to the assigned metal conductor 15 to 18, these metal conductors have a weak point 32 between the end portion 26 and the remaining parts.

Figure 3:
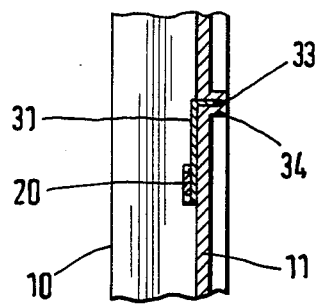
Figure 4:
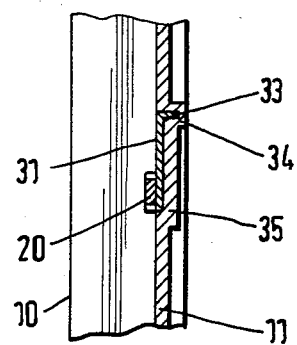

A first portion 33 of the springs 28 is adjacent to the shank 31. As FIGS. 3 and 4 clearly show this portion 33 is perpendicularly bent from the plane of the plate 11 and of the remaining portions 29 to 31 of the springs 28 and inserted in a recess 34 which is formed on the plate 11. The fit in the recess 34 is thereby so firm, that the springs 28 can no longer be lost, when they are mounted. When, thereafter, the metal conductors are mounted and secured by permanently set projections 20 the springs can in addition be secured, in that various projections 20 are deformed across them. In the embodiment according to FIG. 3 the portions 30 and 31 of the springs 28 are supported on the surface of the plate 11 just as the metal conductors 15 to 19. However it seems to be more advantageous, when according to the version of FIG. 4 indentations 35 are provided in the plate 11, in which the portions 30 and 31 of the springs 28 can be inserted.

The common metal conductor 19 for all incandescent lamps has three identical portions 40 of which one each is assigned to a cup-shaped recess 13. The portions 40 are substantially shaped like an open circular ring from the inner rim of which two lugs 41 opposite to each other are rectangularly bent towards the bottom of the recesses 13. The open area of the portions 40 is at any time positioned in the place in which the recesses 13 are provided with the slot 27. Because all metal conductors are to be punched in a single phase of operation from the same sheet metal and the available material can only once be used for a metal conductor the portions 40, in the entirely plane condition of the metal conductor, are outside of their final position, so that both the lugs 41 of the metal conductor 19 and the end portions 26 of the metal conductors 15 to 18 can be punched. By two bendings of about 90° each and in opposite directions around the edges 42 and 43 the portions 40 of the metal conductor 19 have been brought closer to the top recess 13. Now they are positioned at the level of the upper rim of this recess 13 and are supported on it.

We claim:

1. A vehicle light assembly for retaining at least one incandescent lamp, each lamp having a base with a cap connection and at least one center contact, comprising: a lamp holder having at least one cup formed therein and associated with each lamp for receiving said base; at least one metal conductor associated with each lamp and secured to the lamp holder, each metal conductor being insulated from one another; an end portion integral with each metal conductor and extending into each cup for electrical connection with the center contact of each lamp; a spring located within each cup in contact with the end portion, a portion of said spring urging said end portion upwardly in connection with the center contact of the lamp; and a portion of the spring opposite from the center contact located in a recess formed in the lamp holder, so that each spring is securely affixed to the lamp holder, and maintains the end portions of each metal conductor in constant contact with the lamps upon their insertion into the lamp holder wherein the spring includes a first shank in contact with the end portion of at least one metal conductor, a web perpendicular to the first shank, and a second shank perpendicular to the web and affixed to the lamp holder, whereby the shanks and web extend in a plane parallel to a plane including at least one metal conductor.

2. A vehicle light assembly in accordance with claim 1 wherein a portion of the second shank is bent perpendicularly to a plane including at least one metal conductor.

3. A vehicle light assembly in accordance with claim 2 wherein the spring is U-shaped.

4. A vehicle light assembly in accordance with claim 1 wherein the lamp holder has an indentation associated with each spring to receive a portion of the spring.

5. A vehicle light assembly in accordance with claim 1 including deformable projections to press over the metal conductors and secure them to the lamp holder.

6. A vehicle assembly in accordance with claim 1 wherein the spring is a bar spring made from spring wire.

7. A vehicle light assembly in accordance with claim 1 wherein each metal conductor has an aperture at the juncture with the end portion to facilitate deformation of the end portion toward connection with the center contact of the lamp.

8. A vehicle light assembly of claim 1 wherein the metal conductors are coplanar with each other and fastened on the lamp holder approximately at the level of the center contacts.

* * * * *